(12) United States Patent
Gallant et al.

(10) Patent No.: US 8,550,399 B2
(45) Date of Patent: Oct. 8, 2013

(54) FUSELAGE STRUCTURE FOR AN AIRCRAFT FUSELAGE IN COMPOSITE MATERIAL AND AIRCRAFT EQUIPPED WITH SUCH A FUSELAGE STRUCTURE

(75) Inventors: Guillaume Gallant, Finhan (FR); Laurent Giuseppin, Finhan (FR); Damien Aguera, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 529 days.

(21) Appl. No.: 12/681,836

(22) PCT Filed: Sep. 29, 2008

(86) PCT No.: PCT/EP2008/063018
§ 371 (c)(1),
(2), (4) Date: Jun. 25, 2010

(87) PCT Pub. No.: WO2009/047158
PCT Pub. Date: Apr. 16, 2009

(65) Prior Publication Data
US 2010/0264273 A1    Oct. 21, 2010

(30) Foreign Application Priority Data
Oct. 8, 2007   (FR) ..................................... 07 58132

(51) Int. Cl.
*B64C 1/00*    (2006.01)

(52) U.S. Cl.
USPC .......... 244/117 R; 244/119; 244/120; 244/132

(58) Field of Classification Search
USPC ...................... 244/117 R, 119, 120, 132, 133
IPC .......................................................... B64C 1/00
See application file for complete search history.

(56) References Cited

U.S. PATENT DOCUMENTS

| | | | | |
|---|---|---|---|---|
| 4,502,092 | A * | 2/1985 | Bannink et al. | 361/218 |
| 7,277,266 | B1 * | 10/2007 | Le et al. | 361/218 |
| 2003/0168555 | A1 * | 9/2003 | Livi et al. | 244/132 |

FOREIGN PATENT DOCUMENTS

| | | |
|---|---|---|
| EP | 0 048 191 A1 | 3/1982 |
| WO | WO 02/083389 A2 | 10/2002 |
| WO | WO 2007/071879 A2 | 6/2007 |
| WO | WO 2007/071879 A3 | 6/2007 |

* cited by examiner

*Primary Examiner* — Philip J Bonzell
*Assistant Examiner* — Timothy Schwarz
(74) *Attorney, Agent, or Firm* — Oblon, Spivak, McClelland, Maier & Neustadt, L.L.P.

(57) ABSTRACT

A fuselage structure for an aircraft fuselage in composite material and an aircraft including such a fuselage structure. The fuselage structure provides savings in mass while allowing grounding of electric systems, and with which substantial mechanical stiffness characteristics may be guaranteed. In the fuselage structure attachment modules provide an assembling function as well as an electric function.

10 Claims, 5 Drawing Sheets

FUSELAGE STRUCTURE FOR AN AIRCRAFT FUSELAGE IN COMPOSITE MATERIAL AND AIRCRAFT EQUIPPED WITH SUCH A FUSELAGE STRUCTURE

TECHNICAL FIELD

The present invention generally relates to the field of fuselage structures for an aircraft fuselage in composite material.

The invention also relates to an aircraft comprising such a fuselage structure.

STATE OF THE PRIOR ART

Conventionally, an aircraft fuselage comprises panels mounted and attached around an internal structure so as to form, once they are assembled, an aerodynamic outer skin. The internal structure notably consists of structure frames regularly distributed over the whole length of the fuselage and positioned transversely relatively to the longitudinal axis of the fuselage. The structure frames have a substantially circular for example annular or oval shape, having two or three lobes, or further any other shape of the same type. The internal structure also comprises stringers positioned along the longitudinal axis of the fuselage.

The internal structure of the fuselage has the purpose of providing the required mechanical strength to the fuselage. Thus, the frames ensure circumferential stiffening of the fuselage, i.e. along the periphery of the fuselage, and the stringers ensure longitudinal stiffening.

Usually, the members of the fuselage and of its structure (panels, frames, stringers) are made in metal material. With this, it is possible to obtain good mechanical stiffness and it moreover allows the formation of an electric network for grounding the electric systems of the aircraft. Thus, the return of functional and default currents is ensured by the metal members of the structure.

With the present development in the aeronautical field of the use of composite materials comprising a mixture of fibers and resin, a significant gain in mass may be obtained while preserving or improving the mechanical characteristics of the fuselage structure members. For example, international application WO2007/071879, filed in the name of the applicant, describes a fuselage comprising an outer composite material skin attached on an internal metal structure. In order to optimize the gain in mass, the outer skin panels, the structure frames and the stringers may then be made in composite material and no longer in metal material. Attachment modules, such as for example clips, allowing assembling of the different members together may also be made in composite material.

However, it is known that composite materials have low electric conductivity. The fuselage structure members in composite material in particular can no longer form a current return line: the use of composite material for the fuselage structure members then requires that a specific return line be added. Thus, the gain in mass obtained by the use of composite material is amputated by the addition of means dedicated for the return of the current. The gain in mass relating to the whole of the fuselage of such members is then no longer substantial.

With view to the foregoing, with the creations of the prior art, a satisfactory compromise cannot be obtained between the mass savings, the required mechanical stiffness of the fuselage and the grounding of the electric systems.

DISCUSSION OF THE INVENTION

The object of the invention is therefore to propose a fuselage structure for an aircraft fuselage in composite as a remedy to the drawbacks mentioned above relating to the creations of the prior art, and also to present an aircraft comprising such a fuselage structure.

To do this, the object of the invention is a fuselage structure for an aircraft fuselage in composite material comprising:
 at least one structure frame made in a first material,
 at least one outer skin panel in composite material,
 a plurality of attachment modules distributed along the circumference of said structure frame, said attachment modules allowing said panel to be attached on said frame.

According to the invention, said attachment modules are made in a second material having substantially greater electric conductivity than those of said composite material and of the first material, said attachment modules being mounted in contact with each other so as to be connected in series.

Thus, the plurality of attachment modules allows assembly of the outer skin panel(s) to the structure frame(s) while being capable of providing the additional current return function for electric systems. The invention causes a reduction in the number of structure members, because there are no members specifically dedicated to the return line achieved by means of the aforementioned attachment modules. With this, it is then possible to optimize the total mass of the fuselage structure. In other words, the principle of the invention is original and is distinguished from the prior art in the sense that the attachment modules provide both an assembling function and an electric function, by which it is possible to avoid resorting to members specifically dedicated to the return of current.

Advantageously, the second material is a metal material. Indeed, metals have substantial electric conductivities, favorable for making the return line. Thus, in the case when the structure frames in addition to the panels are for example made in a composite material comprising a mixture of fibers and resin, as the composites are usually poor electric conductors, the current return is provided by the attachment modules. The gain in mass is then substantial.

Advantageously, the second material is a metal material to which is affixed a layer of fibers. Thus, with this type of material, it is possible to ensure the return of current, through its substantial electric conductivity, while having high resistance to mechanical stresses because of the presence of reinforcing fibers.

In an embodiment of the invention, the attachment modules each comprise a substantially planar main portion extending along the circumferential direction of the fuselage, a secondary portion located on an outer circumferential edge of the main portion and extending substantially perpendicularly to the main portion and at least one junction portion located on a side edge of the main portion and extending along the circumferential direction of the fuselage so as to connect said plurality of attachment modules in series pairwise.

Thus, the main and secondary portions allow the assembling of panels and structure frames, and the junction portion allows an electric contact to be made between the attachment module so as to allow flow of the default current and of the functional current.

Advantageously, an area of the junction portion of each attachment module is a preferential deformation area. This area is capable of being deformed in the case of relative displacement in the circumferential direction between attachment modules. This relative displacement occurs during significant temperature variations. As the attachment modules are made in a material different from those of the panels and of the frames, the expansion coefficients are therefore different. In order to prevent differential expansion between attachment modules and panels and frames from generating relative displacement and therefore mechanical stresses, a preferential deformation area is therefore provided. This area then deforms so as to avoid any mechanical stress which would make the members of the fuselage structure fragile.

In an embodiment of the invention, the outer skin is attached to at least one stringer positioned along the longitudinal direction of the fuselage. An area of at least one side edge of the main portion of each attachment module has a suitable shape for letting through said stringer.

Advantageously, at least one edge of the outer circumferential edge of the main portion of each attachment module has a shape suitable for letting through said stringer. Several passage spaces may thereby be provided for each attachment module, along the circumferential length of the attachment module.

In an embodiment of the invention, each attachment module comprises at least one second secondary portion extending substantially perpendicularly to the main portion and positioned so as to be substantially parallel to a surface facing said stringer. A second secondary portion is connected to a side edge of the main portion. Thus, the attachment modules allow the stringers to be assembled to the panels and to the structure frames.

The invention also relates to an aircraft comprising a fuselage structure according to any of the preceding claims.

Other advantages and characteristics of the invention will become apparent in the non-limiting detailed description below.

SHORT DESCRIPTION OF THE DRAWINGS

Preferred embodiments of the invention will now be described as non-limiting examples, with reference to the appended drawings, wherein:

FIG. 2b is a cross-sectional view of the fuselage portion illustrated in FIG. 2a;

DETAILED DISCUSSION OF PARTICULAR EMBODIMENTS

Figure 1:
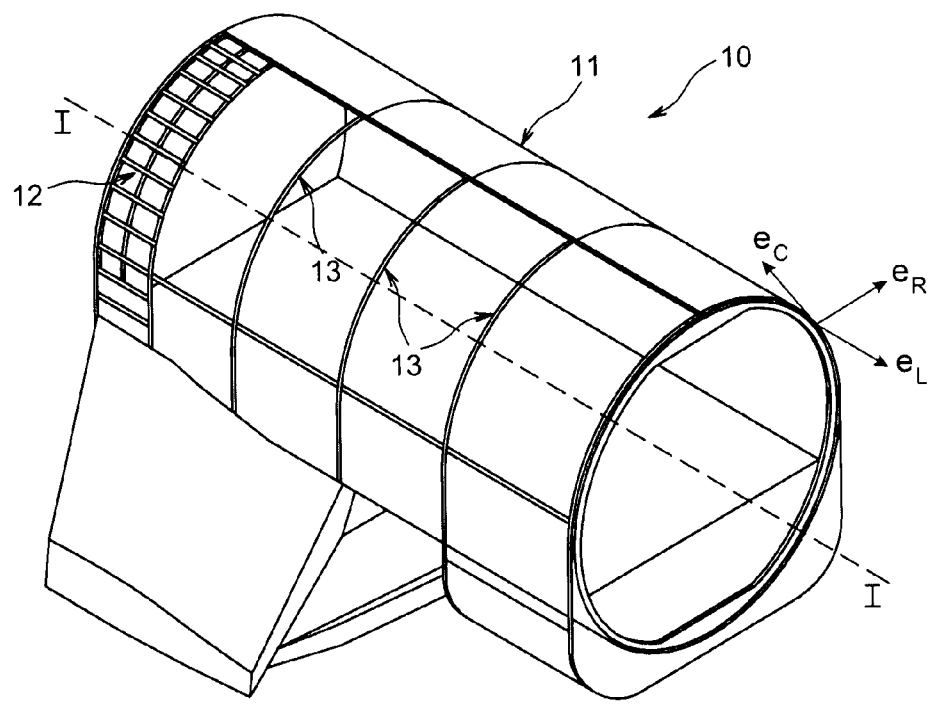
FIG. 1 is a perspective view schematically illustrating an aircraft fuselage segment integrating a fuselage structure made according to the invention.

As schematically illustrated in FIG. 1, the fuselage 10 of an aircraft comprises a plurality of outer skin panels 11 attached to an internal structure. In the preferred embodiment of the invention, the panels 11 are made in a composite material comprising a mixture of fibers and resin. The fuselage 10 may be with variable shape and dimensions depending on the type of aircraft, without departing from the scope of the invention. The internal structure of the fuselage is mainly formed with stringers 12 and structure frames 13. The structure frames 13 are regularly distributed over the whole length of the fuselage 10. Each of them is positioned along a transverse section of the fuselage 10, perpendicularly to the longitudinal axis I-I of the fuselage, and globally has a substantially annular or oval, circular shape, or having two or three lobes, or further having any other shape of the same type.

In the whole description which follows, by convention, a direct orthogonal reference system in cylindrical coordinates $(e_L, e_R, e_C)$ is used, shown in the FIG. 1. The longitudinal direction of the fuselage which coincides with the longitudinal axis I-I substantially corresponding to the axis of revolution of the fuselage, is called $e_L$, $e_R$ is the radial direction of a point belonging to an element of the fuselage structure and $e_C$ is the tangential or circumferential direction at this point.

Figure 2A:
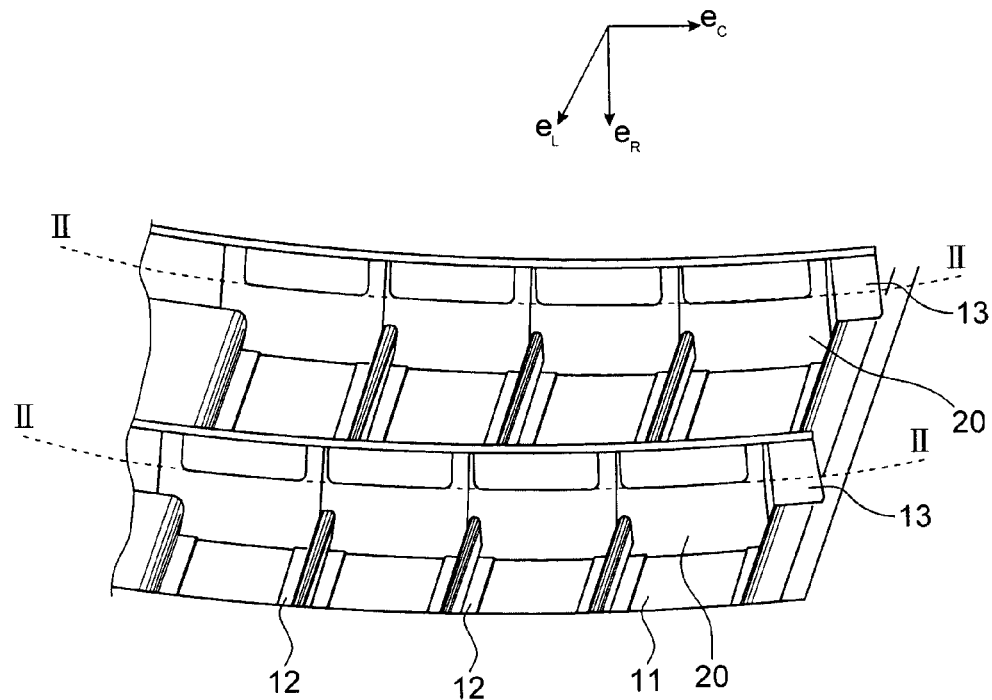
FIG. 2a is a perspective view of a portion of the fuselage structure according to the invention comprising an outer skin panel attached to stringers and connected to frames through attachment modules.
Figure 2B:
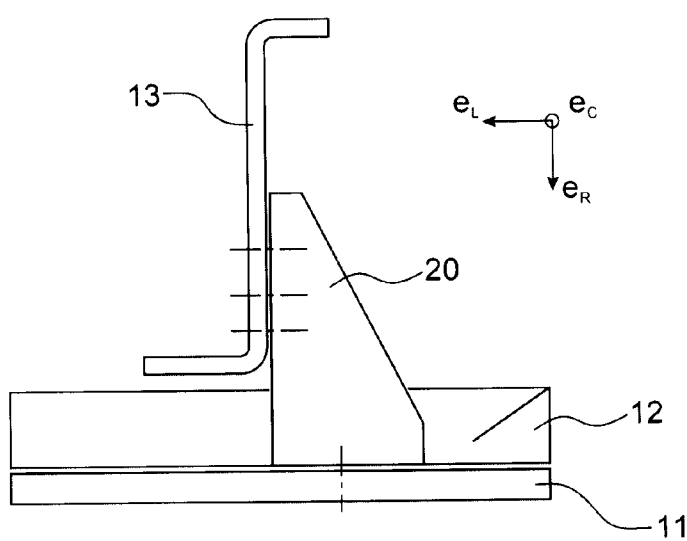

FIG. 2a shows a fuselage structure portion 10 comprising an outer skin panel 11 attached to stringers 12 and connected to frames 13 by attachment modules 20, or clips, according to the invention. The stringers are positioned along the longitudinal direction $e_L$ and ensure longitudinal stiffening of the fuselage. The structure frames are positioned in a plane substantially perpendicularly to the longitudinal direction $e_L$ and extend along a circumferential direction II-II, so as to ensure circumferential stiffening of the fuselage. The circumferential direction II-II is defined as a line, the direction $e_C$ of which is the tangent in each of its points. FIGS. 2a and 2b show stringers 12 with a T-shaped cross-section but other sectional shapes are possible such as for example as a Z, as a I, as a J, as an omega or further any shape with trapezoidal section.

FIG. 2b shows a cross-sectional view of the fuselage structure portion 10 illustrated in FIG. 2a. A panel 11 is attached to at least one stringer 12. A clip 20 allows the panel 11 to be assembled to a structure frame 13 located radially above the stringer 12. The structure frame illustrated in FIG. 2b has a Z-shaped section but other sectional shapes are possible such as for example a J or a C, or further any other shape of the same type.

Figure 3A:
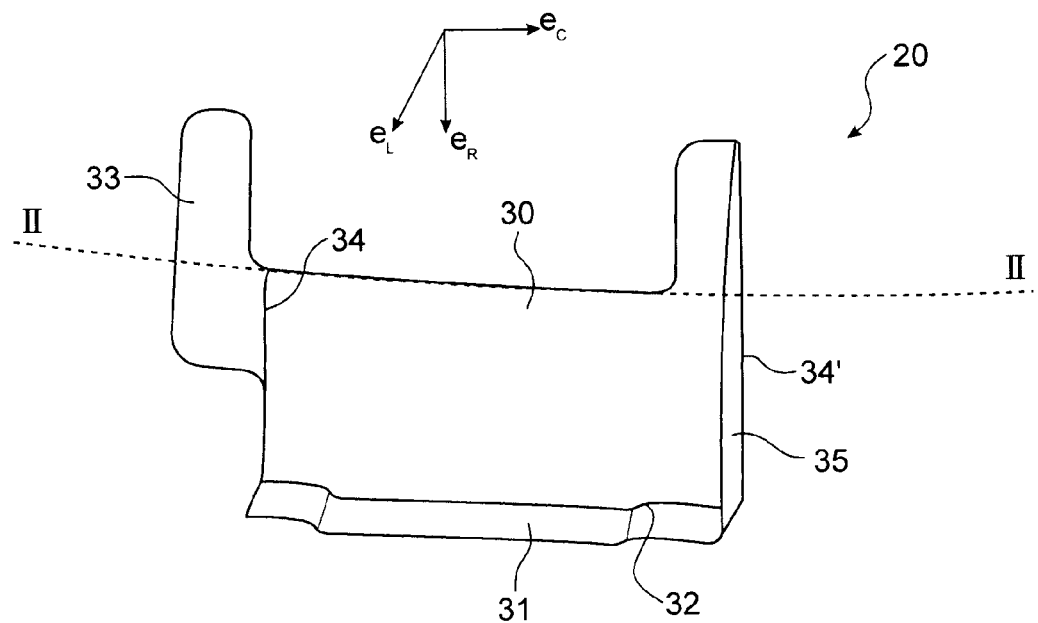
FIGS. 3a and 3b show different ways for making the attachment modules of the fuselage structure according to the invention.

FIG. 3a shows in detail a clip 20 according to a first alternative embodiment of the invention. The clip comprises a main portion 30 substantially planar. The main portion 30 is included in a plane transverse to the longitudinal axis I-I. Further, the planar shape is substantially annular since the main portion 30 follows the circumferential II-II direction. A secondary portion 31 is connected to the main portion at the outer circumferential edge 32 of the main portion 30. The term <<outer>> should be understood in the sense of radial distance away from the longitudinal axis I-I of the fuselage. The secondary portion 31 extends substantially perpendicularly to the main portion 30. The main portion 30 is particularly adapted for being attached to the structure frame 13, for example by riveting or any other conventional technique. The secondary portion 31 is adapted for being attached, for example by riveting or by any other conventional technique, to the outer skin panel 11. The clip 20 comprises a junction portion 33 located on a side edge 34 of the main portion 30 which extends along the circumferential axis II-II. During the placement of the plurality of clips 20 along the frame 13, i.e. in the circumferential direction II-II, each junction portion 33 will come into contact with any portion of the neighboring clip 20, so as to connect the clips 20 in series pairwise. The contact may also be achieved for example by riveting or any other conventional technique or further by pushing under pressure. The clips 20 may also be made interdependent or not with each other.

In this embodiment, the clips 20 ensure a structural function for assembling the panels 11 to the structural frames 13. With the purpose of ensuring an additional function of returning the electric current, the clips 20 are made in a material with a substantially greater electric conductivity than that of the materials of the panels 11 and of the structure frames 13. Thus, with the network formed by the plurality of clips 20 connected in series via the junction portions 33, because of the greater electric conductivity of the clips 20 than that of the panels 11 and frames 13, the electric function of returning the current may be ensured. The material used for making the clips 20 may be any metal material, because of the substantial electric conductivity of metals. The serial connections of the clips 20 form current return lines substantially along the circumferential direction. The return lines may be connected to each other.

An additional advantage relating to the use of metal clips 20 relates to their good mechanical behavior along the main stress direction. The clips 20 are preferably made in a single piece, with a metal sheet which may be embossed and then folded so as to form a main portion 30 and at least one secondary 31, 35. The clips 20 are then mainly stressed upon unfolding, between the main portion 30 and the secondary portion(s) 31, 35. Now, the metal clips 20 have a mechanical behavior upon unfolding which is superior to the mechanical behavior of clips 20 in composite material, a mixture of fibers and resin. Further, making the clips 20 in a metal material has the advantage of being able to be produced at high rates and at lower costs than those of clips in composite material.

The clips 20 may also be made in a metal material including at least one layer of reinforcing fibers, such as for example GLARE, or any other material of the <<fiber metal laminates>> type. The latter has the advantage of having sufficient electric conductivity in order to ensure return of current as well as high resistance to deformation because of the presence of reinforcing fibers.

Figure 4A:
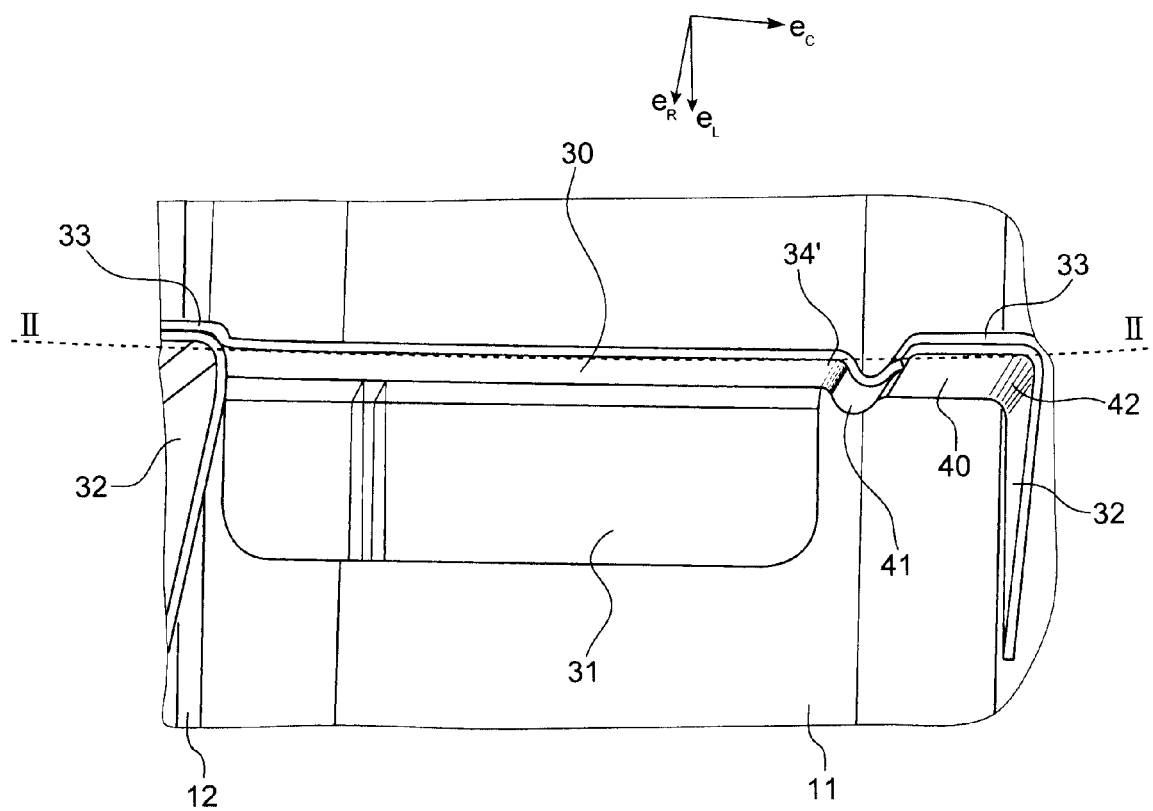
FIGS. 4a, 4b and 4c show embodiments of the invention in particular demonstrating a preferential deformation area on the attachment modules.

In the embodiment of the invention illustrated in FIG. 3a, the clip 20 comprises a second secondary portion 35 extending substantially perpendicularly to the main portion 30 and to the secondary portion 31 and positioned substantially parallel to a surface facing a stringer 12. The three portions 30, 31, 35 form together a corner, such as a trunk corner. This second secondary portion 35, particularly adapted for being attached to the surface opposite the stringer 12, is located on a side edge 34' of the main portion 30 opposite to the side edge 34 bearing the junction portion 33. Both side edges 34, 34' are preferably located at the ends of the main portion 30 in the direction of the circumference. Other arrangements of the second secondary portion are however possible. Thus, it may be located at a side edge 42 of a junction portion 33, as illustrated in FIG. 4a. It may also be located at the side edge 34 where the junction portion is also located, as illustrated in FIG. 4c. Let us note that each clip 20 may of course include several junction portions 33 as well as several second secondary portions 32.

Figure 3B:
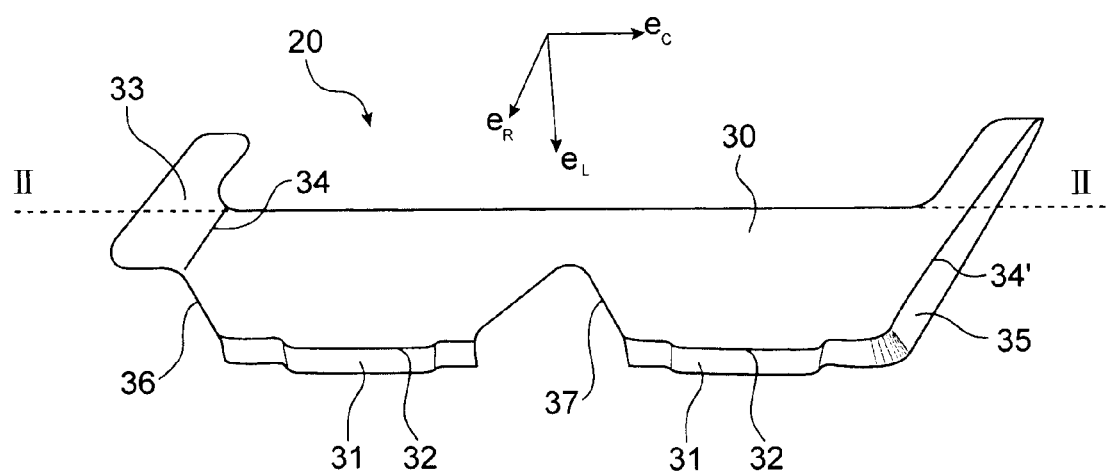

FIG. 3b shows an embodiment of the invention in which an area 36 of the side edge 34 of the main portion 30 is adapted to the transverse geometry of a stringer 12 for letting through the latter. The area 36 then forms an open half-notch. Upon attaching the clips 20 onto the panels 11 and onto the frames 13, the side edge 34 will substantially abut against a surface facing a stringer 13. The area 36 of the side edge 34 is provided for letting through the stringer 12 and for reducing any distance which would separate the junction portion 33 of the relevant clip 20 with the neighboring clip 20, because of the presence of the stringer 12. In this embodiment of the invention, the outer circumferential edge 32 also comprises an area 37 adapted to the transverse geometry of a stringer 13, for letting through the latter. The area 37 then forms an open notch. In this case, the clip has a circumferential length corresponding to two inter-stringer distances. This area 37 thus defines an area for letting through the stringer 13 perpendicularly to the clip 20. Several areas 37 may be provided along the outer circumferential edge 32 along the circumferential length of the clip 20.

The areas 36 and 37 as well as the whole of the geometry of the clips are therefore adapted to the shape of the relevant stringers, but may also be adapted to local specificities, such as for example connecting rods or cross-members of floors.

Figure 4B:
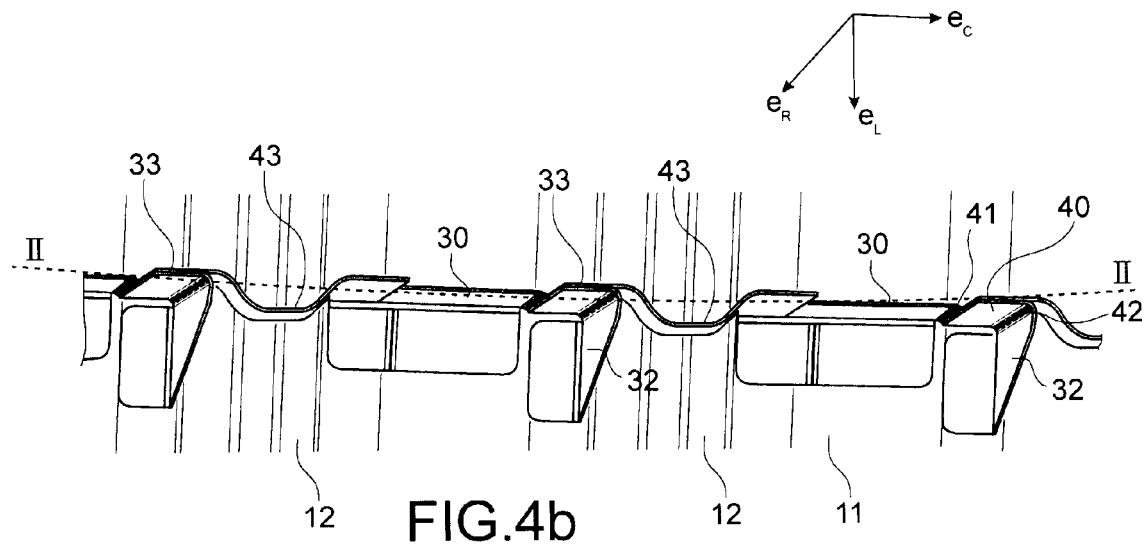
Figure 4C:
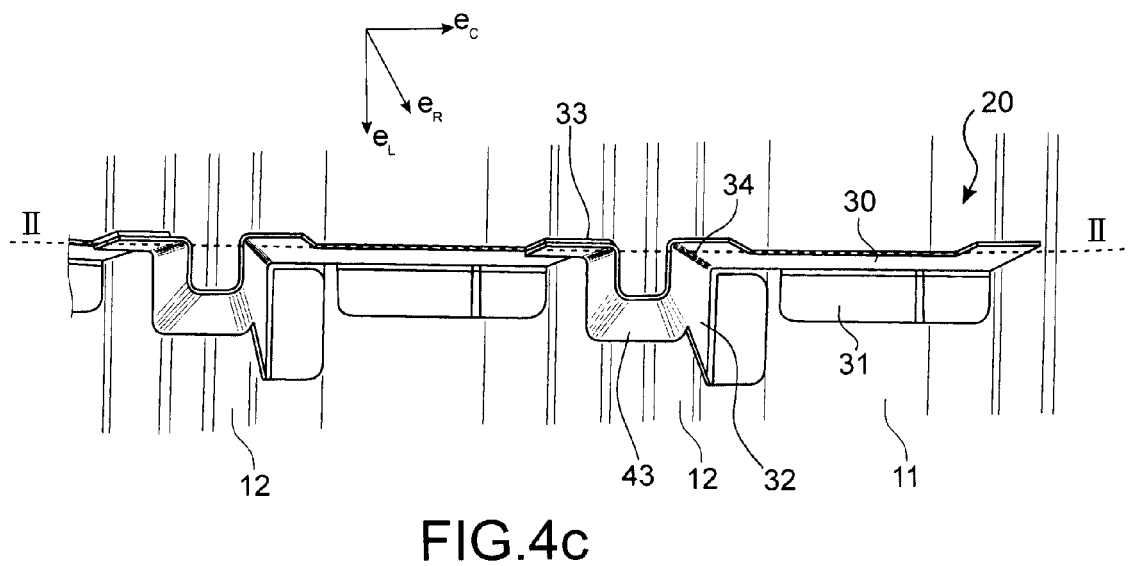

FIGS. 4a, 4b and 4c show embodiments of the invention in which the junction portion 33 includes a preferential deformation area 43. In the case when the clip 20 includes two junction portions 33, 40, each portion may include a preferential deformation area, 43 and 41, respectively. The deformation area 41, 43 may have various shapes. FIG. 4a shows a preferential deformation area 41 of the junction portion 40 in the shape of a circular arc which has constant curvature and extends along the radial direction $e_R$. In this case, as the radius of curvature is small, the deformation area 41 remains substantially contained in the middle plane of the main portion 30 of the clip 20. FIG. 4b shows a clip including two junction portions 33 and 40 each having a preferential deformation area 43 and 41. The deformation area 41 has a small radius of curvature, as described earlier. The deformation area 43 has a large radius of curvature. Both deformation areas may be made by the standard plunging technique or by any other technique. FIG. 4c shows a clip 20, the junction portion of which 33 includes a preferential U-shaped deformation area 43, i.e., the shape of which has a succession of substantially planar portions and of curved portions. Each curved portion may be made by folding so as to obtain a U-shape.

Thus, since the clips 20 have an expansion coefficient different from those of the panels 11 and of the frames 13, a change in temperature causes different expansions of the clips 20 relatively to the panels 11 and to the frames 13. The clips 20 extend along the circumferential axis II-II, also the circumferential expansion of the clips 20 may induce mechanical stresses to the frames 13 and to the panels 11, which amounts to making the fuselage structure 10 fragile. The preferential deformation area 41, 43 of the junction portion 33, 40 is provided in order to deform during a difference of expansion. Thus, the energy produced by the differential expansion of the clips 20 is transmitted into the preferential deformation areas 41, 43 and does not generate any unfavorable mechanical stresses for the fuselage structure 10.

The preferential deformation areas 43, 41 described earlier are made by plunging or folding, but other shapes may also be suitable, such as for example areas of the metal finger sheet type or of the slot type made along the radial direction $e_R$.

An additional advantage of the presence of a junction portion 33, 40 either comprising or not a preferential deformation area 43, 41, lies in the great tolerance for positioning the clips 20 during their placement in the fuselage structure 10.

The invention claimed is:

1. A fuselage structure for an aircraft fuselage in composite material comprising:
   at least one structure frame made of a first material;
   at least one outer skin panel made of a composite material; and
   a plurality of attachment modules distributed along a circumference of the at least one structure frame, the at least one outer skin panel being attached to the at least one structure frame via one or more of the plurality of attachment modules,
   wherein the attachment modules are made of a second material having a substantially greater electric conductivity than an electric conductivity of the composite material and of the first material, the attachment modules being directly connected to each other so as to be connected in series.

2. The fuselage structure for an aircraft fuselage in composite material according to claim 1, wherein the second material is a metal material.

3. The fuselage structure for an aircraft fuselage in composite material according to claim 1, wherein the second material is a metal material to which is affixed a layer of fibers.

4. An aircraft comprising a fuselage structure according to claim 1.

5. A fuselage structure for an aircraft fuselage in composite material comprising:
   at least one structure frame made of a first material;
   at least one outer skin panel made of a composite material; and
   a plurality of attachment modules distributed along a circumference of the at least one structure frame, the at least one outer skin panel being attached to the at least one structure frame via one or more of the plurality of attachment modules,
   wherein the attachment modules are made of a second material having a substantially greater electric conductivity than an electric conductivity of the composite material and of the first material, the attachment modules being mounted in contact with each other so as to be connected in series,
   wherein each attachment module comprises:
   a substantially planer main portion extending along a circumferential direction of the fuselage,
   a secondary portion located on an outer circumferential edge of the main portion and extending substantially perpendicularly to the main portion, and
   at least one junction portion located on a side edge of the main portion and extending along the circumferential direction of the fuselage so as to connect in series the plurality of attachment modules pairwise.

6. The fuselage structure for an aircraft fuselage in composite material according to claim 5, wherein an area of the junction portion of each attachment module is a preferential deformation area.

7. The fuselage structure for an aircraft fuselage in composite material according to claim 5, further comprising at least one stringer to which is attached the at least one outer skin panel, the at least one stringer being positioned along a longitudinal direction of the fuselage,
   wherein an area of at least one side edge of the main portion of each attachment module has an adapted shape for letting through the stringer.

8. The fuselage structure for an aircraft fuselage in composite material according to claim 7, wherein the second secondary portion is connected to a side edge of the main portion.

9. The fuselage structure for an aircraft fuselage in composite material according to claim 5, further comprising at least one stringer to which the at least one outer skin panel is attached, the at least one stringer being positioned along a longitudinal direction of the fuselage,
   wherein at least one area of the outer circumferential edge of the main portion of each attachment module has an adapted shape for letting through the stringer.

10. The fuselage structure for an aircraft fuselage in composite material according to claim 5, further comprising at least one stringer to which is attached the at least one outer skin panel, the at least one stringer being positioned along a longitudinal direction of the fuselage,
   wherein each attachment module comprises at least one second secondary portion extending substantially perpendicularly to the main portion, the at least one second secondary portion being positioned so as to be substantially parallel to a surface facing the stringer.

* * * * *